United States Patent
Kim et al.

(10) Patent No.: US 7,174,417 B2
(45) Date of Patent: Feb. 6, 2007

(54) BUFFER ALLOCATION METHOD SUPPORTING DETECTION-BASED AND AVOIDANCE-BASED CONSISTENCY MAINTENANCE POLICIES IN A SHARED DISK-BASED MULTI-DATABASE MANAGEMENT SYSTEM

(75) Inventors: Hong Yeon Kim, Taejon (KR); Hun Soon Lee, Taejon (KR); June Kim, Taejon (KR); Myung-Joon Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 361 days.

(21) Appl. No.: 10/706,933

(22) Filed: Nov. 14, 2003

(65) Prior Publication Data

US 2004/0236913 A1 Nov. 25, 2004

(30) Foreign Application Priority Data

Dec. 24, 2002 (KR) .................. 10-2002-0083164

(51) Int. Cl.
*G06F 12/00* (2006.01)
(52) U.S. Cl. .................. 711/106; 711/141; 711/147; 711/112
(58) Field of Classification Search .................. 710/56; 711/141, 112, 130, 147, 210, 106, 148, 149, 711/150, 151, 152, 168
See application file for complete search history.

(56) References Cited

U.S. PATENT DOCUMENTS

| 5,327,556 | A | | 7/1994 | Mohan et al. |
| 5,537,574 | A | * | 7/1996 | Elko et al. .................. 711/141 |
| 5,546,579 | A | | 8/1996 | Josten et al. |
| 5,551,046 | A | * | 8/1996 | Mohan et al. .................. 707/8 |
| 5,596,754 | A | * | 1/1997 | Lomet .................. 710/200 |
| 5,737,536 | A | * | 4/1998 | Herrmann et al. .......... 709/229 |
| 5,875,468 | A | * | 2/1999 | Erlichson et al. ........... 711/143 |
| 5,918,229 | A | * | 6/1999 | Davis et al. .................. 707/10 |
| 6,463,503 | B1 | * | 10/2002 | Jones et al. .................. 711/114 |
| 6,826,570 | B1 | * | 11/2004 | Eshel et al. .................. 707/8 |

OTHER PUBLICATIONS

Erhard Rahm; "*Concurrency and Coherency Control in Database Sharing Systems*"; Technical Report ZRI Mar. 1991, Dec. 1991; Revised on Mar. 1993; pp. 1-62.

* cited by examiner

*Primary Examiner*—Sanjiv Shah
*Assistant Examiner*—Yaima Campos
(74) *Attorney, Agent, or Firm*—Mayer Brown Rowe & Maw LLP (57) ABSTRACT

A cache consistency maintenance procedure to select one of a detection-based cache consistency maintenance procedure optimized for record-based locking and an avoidance-based consistency-based maintenance procedure optimized for table and block-based locking. To support the characteristic of DBMS in which table locking and record locking are consistent to access the same table, the two kinds of the consistency maintenance policies for the same block are processed by a single buffer load process and the two kinds of the consistency maintenance policies are consistent with each other to provide better configuration and performance.

4 Claims, 5 Drawing Sheets

FIG. 1

(PRIOR ART)

BUFFER ALLOCATION METHOD SUPPORTING DETECTION-BASED AND AVOIDANCE-BASED CONSISTENCY MAINTENANCE POLICIES IN A SHARED DISK-BASED MULTI-DATABASE MANAGEMENT SYSTEM

BACKGROUND OF THE INVENTION

1. Field of the Invention

The present invention relates to a cache coherency maintaining method for a database management system (DBMS) operating in a shared disk multisystem, and more particularly, to a buffer allocation method of supporting a detection-based consistency maintenance policy and an avoidance-based consistency maintenance policy in a shared disk-based multi-DBMS improved in which an optimal procedure for each type is selectable by using the characteristic of the DBMS controlled coherently by units of table, block and record and the respective procedures coexist to obtain more improved performance.

2. Discussion of the Related Art

Generally, when it is required to cache the same data in two or more systems, a cache consistency maintenance procedure is used to prevent cached contents from being inconsistent with each other, and is used as an essential procedure in a shared disk-based file system, a client server DBMS, a parallel DBMS, a cluster DBMS, etc.

Figure 1:
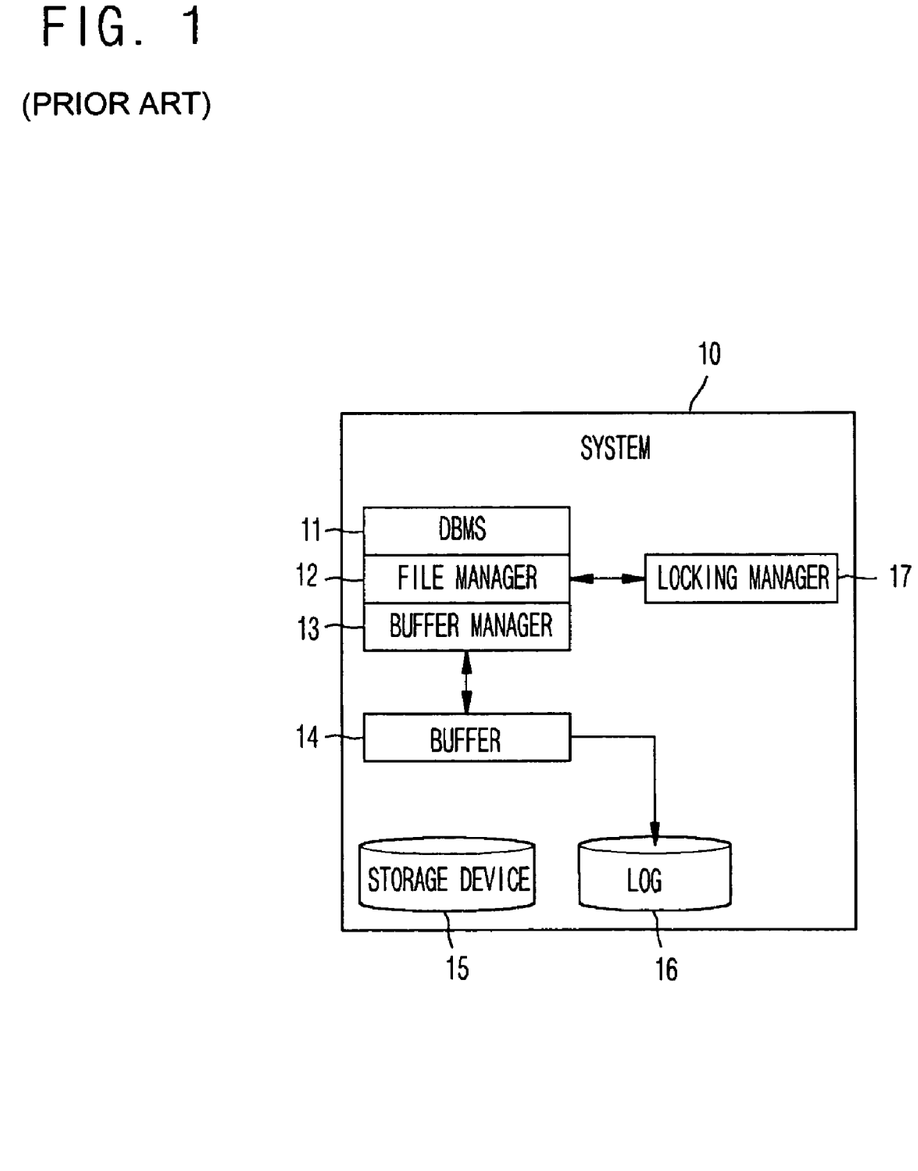
FIG. 1 is a block diagram to illustrate the database management system operated in the conventional single system.

A database management system 10 managed in the conventional single system includes a DBMS 11, a file manager 12, a buffer manager 13, a buffer 14, a storage device 15, a log device 16 and a locking manager 17. In this system, since a unit of cache is a block used as a unit for input/output from/to a storage device, the cache consistency maintenance is performed in the block unit. In other words, when an access to a buffer is performed to read and update a disk block in the specific system, the buffer manager is ensured to provide the recent contents.

Various methods for this scheme are being proposed currently. Rahm E. divided a block-based consistency maintenance scheme into a detection-based scheme and an avoidance-based scheme in the paper entitled "Concurrency and Coherency Control in Database Sharing Systems", Technical Report ZRI 3/91, University of Kaiserslautern, Dept. of Computer Science.

In the detection-based scheme, upon access to a buffer, if there is a block cached in the buffer, it is checked whether or not the block is proper to use according to some criterion. If the block is improper to use, the block of a most recent version is loaded by a predetermined procedure. In this scheme, when updated, only the information that the block has been updated is propagated to each system or kept at a shared area to keep the older version of the block cache. So, update propagation does not cost much.

There is a method to track whether or not a block was updated. In this method, the number of a recent version is kept at a specific location and is transferred to the buffer manager when accessing the buffer. The transferred number is compared with the number of a version of the cached block.

The paper discloses that the performance can be improved when the detection-based scheme is combined with locking by record. Generally, there are a few records in a block. Even though a specific record of a specific block is being updated, the block of the old version cached in the system can be used if another system accesses a record of the same block that is not being updated.

In this case, as a result of a record locking, the version number of the block required to access the record is transferred and this information is used to check validity of the block cached when buffer is loaded. This procedure is disclosed in the U.S. Pat. No. 5,327,556 entitled "Fast intersystem page transfer in a data sharing environment with record locking". In the patent, the L-lock for record locking and the P-lock for authorizing to load page on buffer are used to describe the record level detection-based scheme.

However, this detection-based scheme cannot obtain information on version from lock result when accessing a record accompanied with table-based lock. In other words, table-based lock is obtained once before accessing all of the records in the table. Accordingly, whenever accessing a record, the version of the corresponding block should be obtained which is very inefficient.

In the avoidance-based scheme, when updating a buffer, caches of all the systems storing those of old version are invalidated and updated. The contents of the caches are propagated to the systems. This scheme costs much to update but it ensures that the blocks loaded in the buffers are always recent versions.

According to this scheme, if a specific block is being updated in a specific system, accessing the block is delayed in all the other systems until the block is updated completely. Instead, since it is not required to check the validity of the cached block, the procedure of obtaining a version number is not required before a buffer is allocated.

The avoidance-based scheme is proper to control consistency of the information read and updated block by block in DBMS. This information includes a system catalog block, index block, etc. The avoidance-based scheme is proper since these blocks are not allowed to be accessed.

The avoidance-based scheme can be used as a consistency maintenance method when accessing the record while locking a table. When this scheme is employed, it is not required to obtain the version information of the recent block before loading a buffer.

In the general DBMS, multi-granularity locking is employed in which table-based locking and record-based locking are used simultaneously. Therefore, to manage the table, detection-based scheme and avoidance-based scheme are used simultaneously according to a unit of locking.

These two methods should be applied interworking with each other using the same buffer space. If these two methods do not interwork with each other and use separate buffer spaces, the predictable problem is as follows.

First, when the specific block is allocated in the avoidance-based scheme, the specific block may be allocated in the same system and the other system in the detection-based scheme. In this case, the consistency of the cache of the database is deteriorated Second, when the specific block is allocated in the detection-based update mode, it can be allocated in the avoidance-based read mode. So, problems may occur in the avoidance-based consistency control.

Third, when the specific block is allocated in the avoidance-based update mode, other systems can access the specific block in the detection-based read mode. So, problems may occur in the avoidance-based consistency control.

Accordingly, in the procedure to maintain cache consistency for DBMS, the two schemes should be supported and interwork with each other but there is no consistency maintenance procedure to meet these requirements now.

SUMMARY OF THE INVENTION

Accordingly, the present invention is directed to a buffer installation method supporting a detection-based consistency maintenance policy and avoidance-based consistency maintenance policy in a shared disk-based multi-DBMS that substantially obviates one or more problems due to limitations and disadvantages of the related art.

An object of the present invention is to provide a buffer installation method supporting a detection-based consistency maintenance policy and avoidance-based consistency maintenance policy in a shared disk-based multi-DBMS to make the detection-based consistency maintenance scheme and the avoidance-based consistency maintenance scheme interwork with each other and select one of them to use according to necessity and make it possible to access records by multi-granularity locking to enhance its performance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the present invention provides a buffer installation method to select a consistency maintenance scheme when installing a buffer, and designating a version number of the block to install when selecting a detection-based scheme.

In another aspect of the present invention, a buffer installation method supporting a detection-based and avoidance-based consistency maintenance policy in a shared disk-based multi-DBMS comprises the steps of: (a) when a page identifier, an access mode (read, write) and a consistency maintenance scheme (detection, avoidance) are selected and a buffer is requested to be allocated, calculating a buffer locking mode required based on a SMTBM matrix; and (b) requesting a global locking manager to lock a buffer in the calculated buffer locking mode in case that an the obtained buffer locking mode is less than the calculated buffer locking mode or a version of a loaded block is lower than a required version when detection-based consistency maintenance scheme is selected, and approving buffer allocation otherwise, wherein a detection-based consistency maintenance scheme and an avoidance-based consistency maintenance scheme are integrated in a single procedure to interwork with each other.

In another aspect of the present invention, a method of processing a global locking request in a DBMS operated in a shared disk-based multi-system comprises the steps of: (a) obtaining a locking by an update authority (WX, X) in a system that has obtained a requested locking, transferring a corresponding block to a system that cached the corresponding block, and requesting to update a lock authority; (b) determining whether the system is not compatible to a requested lock according to a BLCM matrix in the system that has obtained the requested lock in a read mode (WS, S); and (c) instructing a system to update the lock authority, the system being determined not to be compatible.

In another aspect of the present invention, a method of a global locking manager for processing a locking authority update request and a block transfer request in a DBMS operated in a shared disk-based multi-system comprises the steps of: (a) when a current system has obtained a locking by an update authority (WX, X) and a current block is updated, writing a log forcedly about the current block based on write ahead logging (WAL) and writing a corresponding block on a disk or transferring the corresponding block through a transfer path; (b) updating a currently owned buffer locking mode to satisfy a buffer locking mode requested by a remote system using a BLCM matrix; and (c) removing a corresponding block completely when returning a buffer locking as a result of the step (b), and completing to update an ownership otherwise.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 2:
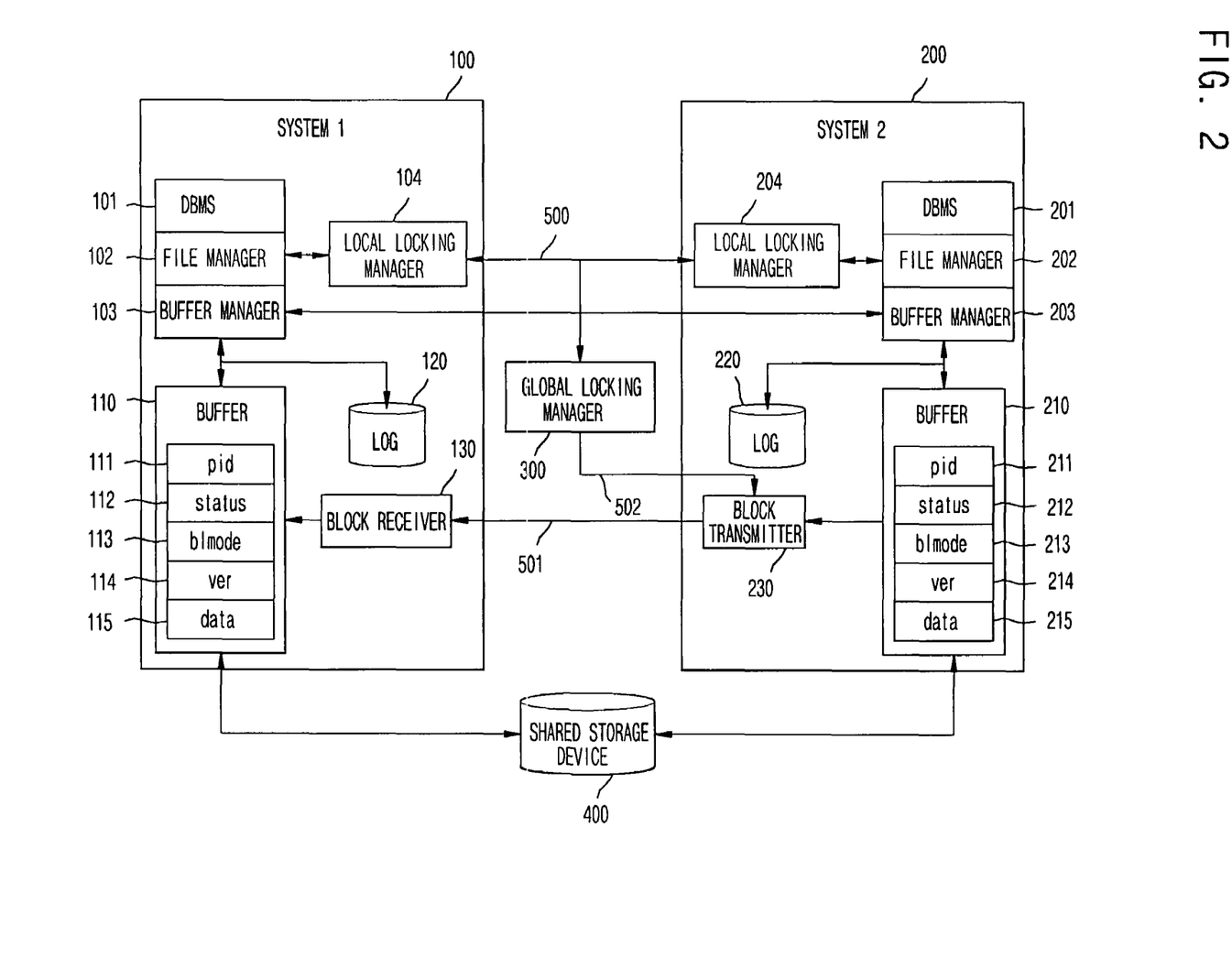
FIG. 2 is a block diagram to illustrate the database management system operated in the environment of the present invention.

FIG. 2 is a block diagram to illustrate the database management system operated in the environment of the present invention.

The database management system of the present invention has a first system 100 and a second system 200. The systems 100 and 200 have a log device 120 and 220, respectively. The two systems share a shared storage device 400.

The systems 100 and 200 of the present invention include a DBMS 101 and 201, a file manager 102 and 202, a buffer manager 103 and 203 and a local locking manager 104 and 204, respectively. A block receiver 130 and a block transmitter 230 are connected to each other through a communication path 501. The local locking managers 104 and 204 of each node are connected to each other through a global locking manager 300 and a communication path 500. The global locking managers 104 and 204 are connected to a block transmitter 230 of the second system 200.

The buffer 110 and 210 to which the present invention is applied includes a block identifier (pid) 111 and 211, a load status (status) 112 and 212, a buffer locking mode (blmode)

113 and 213, a load version (ver) 114 and 214 and load data (data) 115 and 215, respectively.

The DBMS of the first system 100 analyzes a provided inquiry and instructs the file manager 102 to access a series of databases. The file manager 102 obtains a proper locking according to the type of data and requests the buffer manager to allocate a necessary block on a disk to access actual data. The buffer manager 103 receives the block of the recent version or reads the corresponding block from the disk with an aid of each module of the global locking manager 300 and the second system 200 to load on the buffer and approve allocation. In this process, various information in a buffer are referred to or updated.

Figure 3:
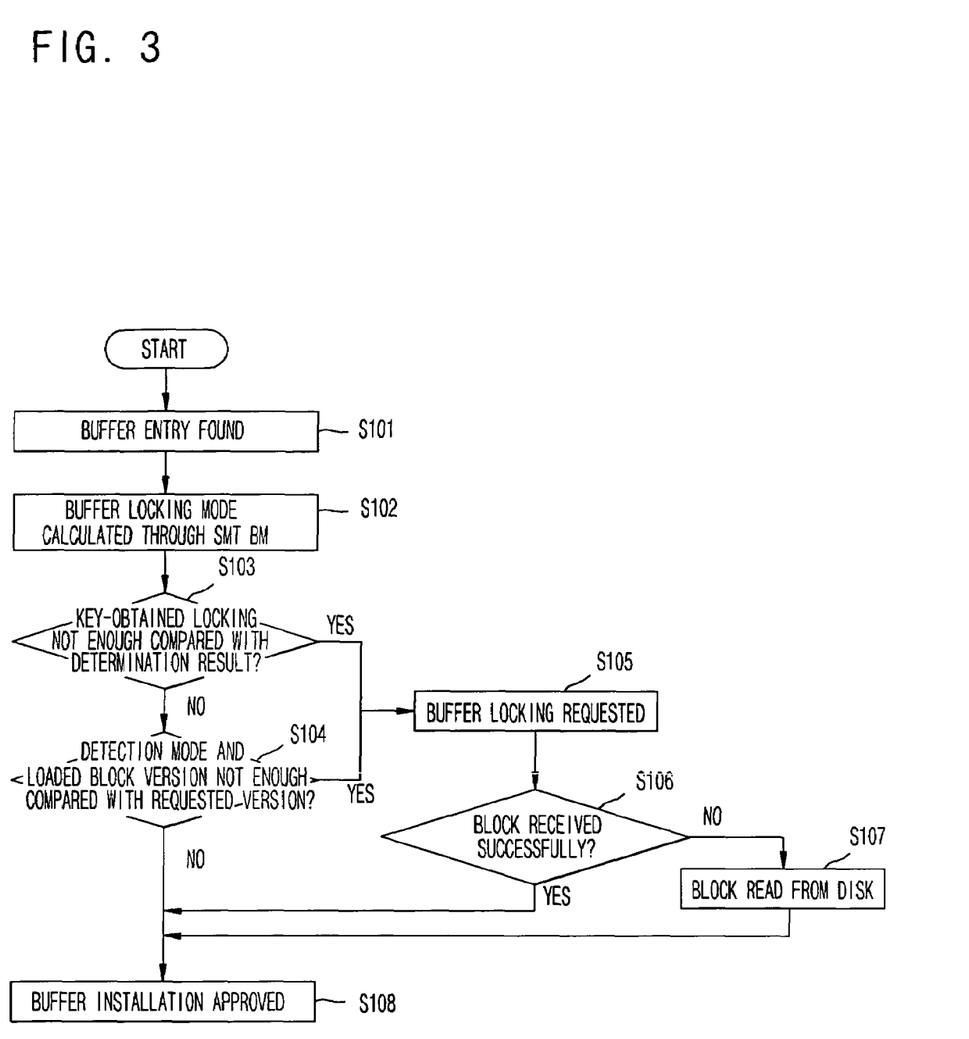
FIG. 3 is a flowchart to illustrate a buffer allocation method including cache consistency maintenance policy provided by the present invention.

FIG. 3 is a flowchart to illustrate a buffer allocation method including cache consistency maintenance policy provided by the present invention;

Referring to FIG. 3, the buffer allocation request of the present invention includes identifiers of a block, access modes, consistency maintenance modes and version numbers of the block. The access modes include READ and WRITE. The consistency maintenance modes include DETECT and AVOID. As long as the consistency maintenance mode is DETECT, the version number of the block is designated.

If buffer allocation is requested, the buffer manager 103 finds or allocates the corresponding buffer entry (S101). The buffer locking mode for processing the current request is calculated using the scheme mode to buffer lock mode matrix (SMTBM) as following Table 1 (S102). If the buffer locking mode determined like this is enough compared with the already obtained buffer locking mode, the buffer allocation request is approved immediately.

If the obtained locking mode is not enough compared with the requested buffer locking mode (S103) or the consistency maintenance mode is DETECT and the version of the current loaded block does not satisfy the requested version (S104), the global locking manager is requested for the buffer locking (S105), waits for until approval. In this status, when succeeding to receive a block (S106), the buffer allocation is approved. When failing to receive a block, the block is read from a disk (S107).

In the step S104, if the buffer locking is approved, it is checked whether the requested block is received. If succeeding to receive, the buffer allocation is approved immediately. Otherwise, the corresponding block is read from the disk to load on the buffer and the buffer allocation is approved (108).

TABLE 1

| Policy | Access | |
|---|---|---|
| | Read | Write |
| Detection | WS | WX |
| Avoidance | S | X |

Table 1 illustrates the matrix SMTBM used in FIG. 3. Referring to FIG. 3, SMTBM is the matrix to find a buffer locking mode through requested consistency maintenance modes and access modes. The necessary buffer locking mode is the crossing portion of the row of the consistency maintenance mode and the column of the access mode requested by the matrix SMTBM.

The buffer locking modes include four kinds of modes, e.g., weak shared (WS), weak exclusive (WX), shared (S) and exclusive (X). The modes of WS and WX are used as the shared mode and the exclusive mode in detection-based buffer locking mode. The modes of S and X are used as the shared mode and the exclusive mode in avoidance-based buffer locking mode.

Figure 4:
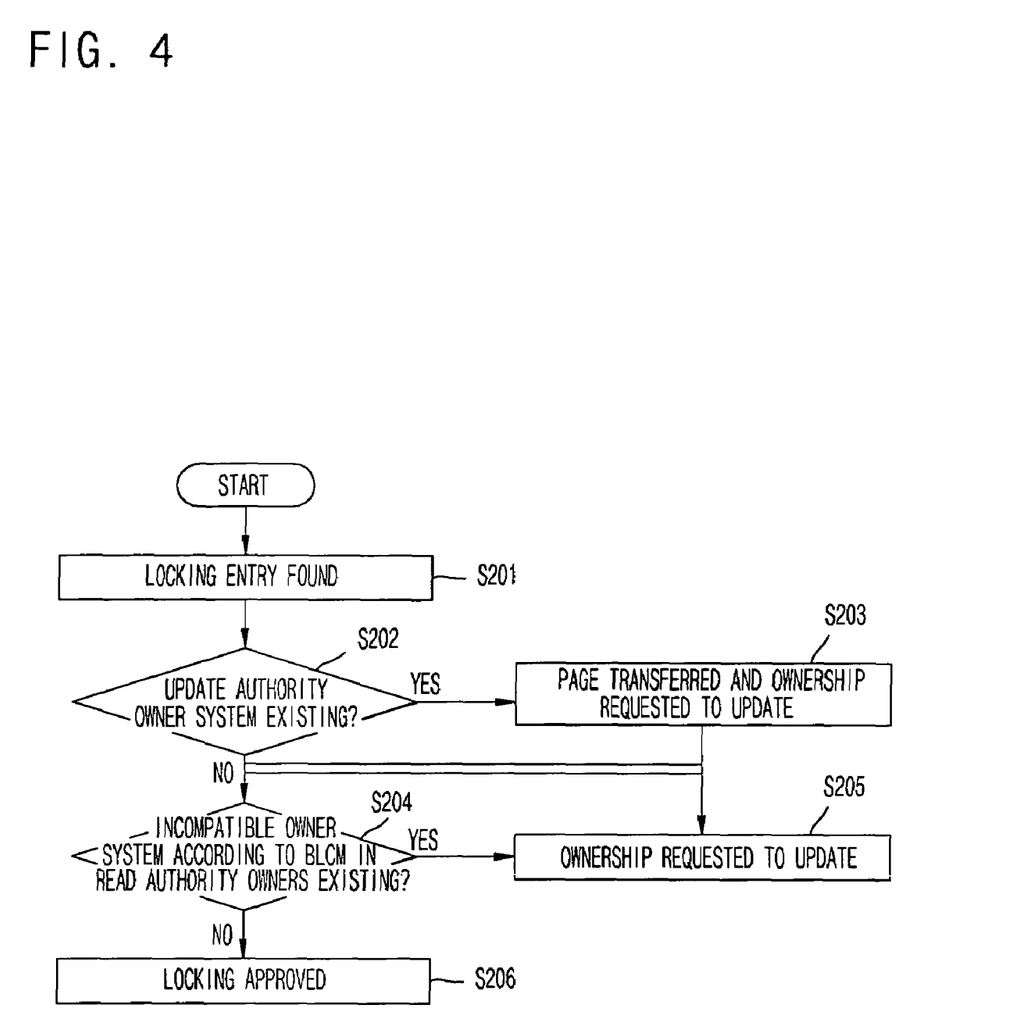
FIG. 4 is a detailed flowchart to illustrate a buffer locking approval procedure in global locking manager to which the present invention is applied.

FIG. 4 is a detailed flowchart to illustrate a buffer locking approval procedure in global locking manager to which the present invention is applied.

Referring to FIG. 4, the present invention finds a locking entry corresponding to the requested block identifier in the global locking table and obtains the exclusive usage authority (S201). Then, the locking entry is searched (S202). The request (S203) to update transfer and ownership for the page requested by the system that obtained the buffer locking as the exclusive mode (WX, X) is sent to the block transmitter 230 of the system.

Then, all the systems that is not compatible to the requested buffer locking among the systems that obtained the buffer locking in the shared modes (WS, S) is determined through buffer lock compatibility matrix (BLCM) as Table 2 (S204). The request (S205) to update ownership authority of the system is sent to the block transmitter 230 of the system. If the process is completed, the buffer locking requested finally is registered on the locking table and the locking is approved (S206).

TABLE 2

| Convention | Request | | | |
|---|---|---|---|---|
| | WS | S | WX | X |
| NL | T | T | T | T |
| WS | T | T | T | F |
| S | T | T | F | F |
| WX | T | F | F | F |
| X | F | F | F | F |

Table 2 illustrates the matrix BLCM used in FIG. 4. Referring to FIG. 4, BLCM is the matrix to determine whether the buffer locking belonging currently to a specific system is compatible to the buffer locking requested currently. In the matrix BLCM, if the crossing portion of the row corresponding to the buffer locking belonging currently to a specific system and the column of the buffer locking requested currently is T, it means that the ownership authority of the system does not have to update to approve the requested locking. If it is F, it means that the ownership authority of the system should be updated.

Figure 5:
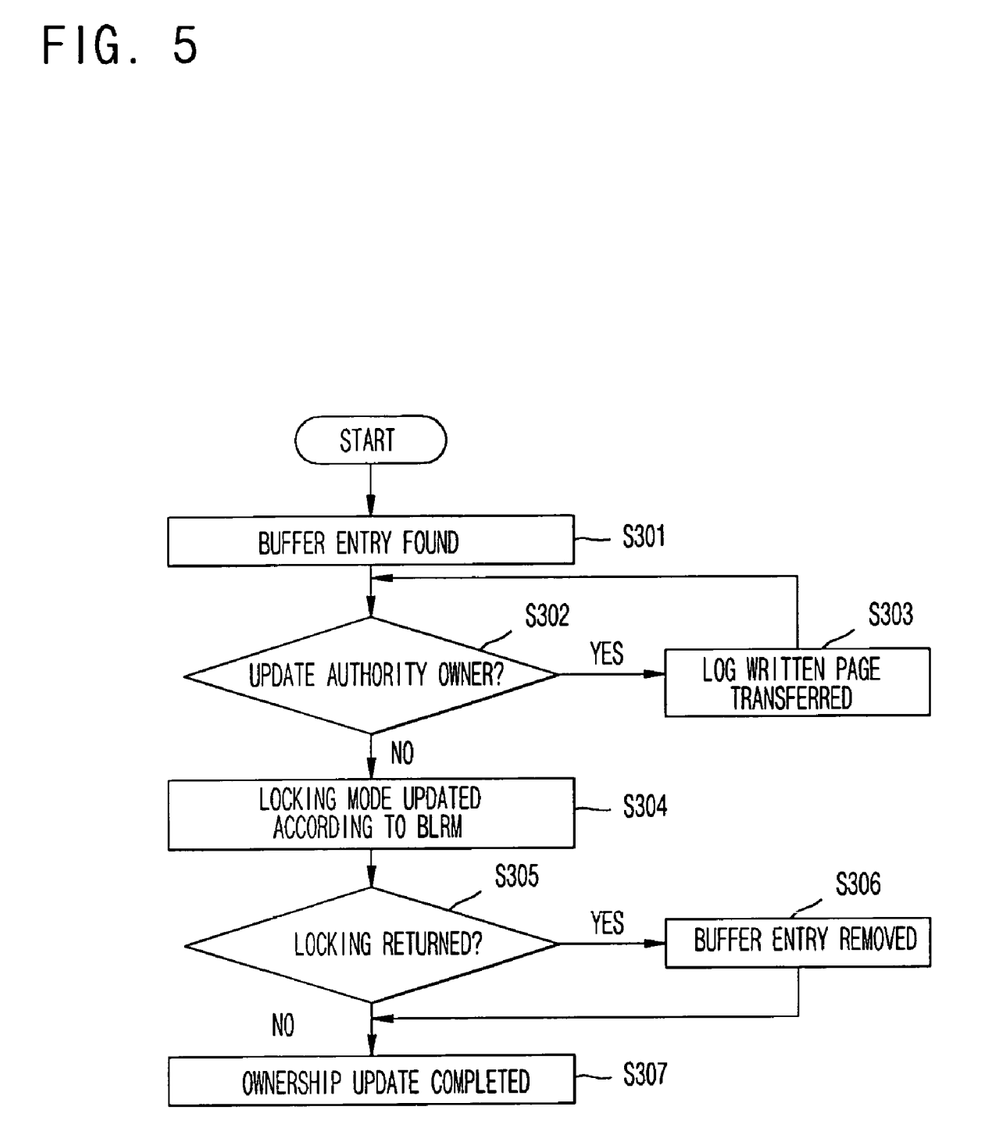
FIG. 5 is a flowchart illustrating a procedure to update ownership authority of block of the present invention.

FIG. 5 is a detailed flowchart illustrating a procedure to transmit a block of the block transmitter of the second system to which the present invention is applied and to update ownership authority of block of the present invention. The block transmitter uses an identifier and a requested buffer locking mode of the block to be processed.

Referring to FIG. 5, the identifier of the block is used to find a buffer entry (S301) to obtain the exclusive usage authority. If the loaded authority is the exclusive mode (WX, X) (S302), a log is written on a log device by the WAL protocol for the corresponding block and the corresponding block is transferred through a disk and a communication path (S303).

In step (S302), if the currently loaded authority is not the exclusive mode (WX, X), the buffer locking mode to be owned is determined using a buffer lock revocation matrix (BLRM) as following Table 3 (S304). If the determined locking mode is not No Lock (NL), it is completed immediately. Otherwise, the corresponding buffer entry is removed from the buffer completely and it is completed (S305 to S307).

TABLE 3

| Convention | Request | | | |
|---|---|---|---|---|
| | WS | S | WX | X |
| WS | WS | WS | WS | NL |
| S | S | S | WS | NL |
| WX | WX | S | WS | NL |
| X | WX | S | WS | NL |

Table 3 illustrates the matrix BLRM used in FIG. 5. Referring to FIG. 5, BLRM is the matrix to determine the mode to update for the currently owned buffer locking to approve the buffer locking requested by other system. The buffer locking mode is the crossing portion of the row corresponding to the currently owned buffer locking and the column corresponding to the requested buffer locking in the matrix BLRM. If this locking is NL, it means that the locking cannot be owned any longer and the corresponding buffer entry should be removed from the buffer completely.

As described above, the present invention allows to select and use one of the two kinds of the cache consistency maintenance schemes in the DBMS operated in the shared disk-based multi-system and to make these two kinds of the schemes interwork with each other. The following effects are expected.

First, the optimal cache consistency maintenance policy is employed for each granule corresponding to the essential multi-granularity locking in DBMS.

Second, the optimal cache consistency maintenance policy is employed for each case so that unnecessary block change between systems is reduced to improve the performance of the entire system.

Third, the two kinds of the cache consistency maintenance policy is integrated into the single buffer loading process to interwork so that the configuration of the system is simplified and implementation is easy.

Above-mentioned description is merely an example to illustrate a buffer allocation method supporting a detection-based and avoidance-based consistency maintenance policy in a shared disk-based multi-DBMS. The present invention is not bounded to the embodiments. It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A buffer allocation method supporting a maintenance policy in a shared disk-based multi Database Management System, the method comprising the steps of:
   (a) calculating a required buffer locking mode based on a scheme mode to buffer lock mode matrix (SMTBM) shown below when a block identifier, an access mode (read, write) and a consistency maintenance policy (detection, avoidance) are selected and a buffer manager is requested to allocate a block on a disk to access actual data; and
   (b) requesting a global locking manager to lock a buffer in the calculated buffer locking mode in case an obtained buffer locking mode is less than the calculated buffer locking mode or a version of a loaded block is lower than a required locking mode when the detection-based consistency maintenance scheme is selected, and approving buffer allocation otherwise, wherein a detection-based consistency maintenance scheme and an avoidance-based consistency maintenance scheme are integrated in a single procedure to interwork with each other;

wherein, if using the detection-based consistency maintenance scheme and access mode is Read access, the required buffer locking mode is Weak Shared;

wherein, if using the detection-based consistency maintenance scheme and the access mode is Write access, the required buffer locking mode is Weak Exclusive;

wherein, if using the avoidance-based consistency maintenance scheme and the access mode is Read access, the required buffer locking mode is Shared; and wherein, if using the avoidance-based consistency maintenance scheme and the access mode is Write access, the required buffer locking mode is Exclusive.

2. The method as claimed in claim 1, wherein the step (b) includes the steps of:
   (b-1) when succeeding to receive a block in a state that the buffer is requested to lock, approving to allocate the buffer; and
   (b-2) when failing to receive a block, reading the block from a disk to approve to allocate the buffer.

3. A method of processing a global locking request in a Database Management System operated in a shared disk-based multi-system, the method comprising the steps of:
   (a) obtaining a locking by an update authority (WX, X) in a system that has obtained a requested locking, allocating a corresponding block to a system that cached the corresponding block, and requesting to update a lock authority;
   (b) determining whether the system is not compatible to a requested lock locking according to a buffer lock compatibility matrix (BLCM) in the system that has obtained the requested lock in a read mode (WS, S), the step (b) further comprising:
      (b1) wherein, if buffer locking belonging currently is NL (no lock), ownership authority of the system does not need to update;
      (b2) wherein, if buffer locking belonging currently is WS (weak shared) and the requested locking is WS, S (shared) or WX (weak exclusive), the ownership authority of the system does not need to update;
      (b3) wherein, if buffer locking belonging currently is WS (weak shared) and the requested locking is X (exclusive), the ownership authority needs to update;
      (b4) wherein, if buffer locking belonging currently is S and the requested locking is WS or S, the ownership authority of the system does not need to update;
      (b5) wherein, if buffer locking belonging currently is S and the requested locking is WX or X, the ownership authority of the system needs to update;
      (b6) wherein, if buffer locking belonging currently is WX and the requested locking is WS, the ownership authority of the system does not need to update;
      (b7) wherein, if buffer locking belonging currently is WX and the requested locking is S, WX or X, the ownership authority of the system need to update;
      (b8) wherein, if buffer locking belonging currently is X, the ownership authority of the system needs to update; and
   (c) instructing a system to update the lock authority if the system is determined not to be compatible.

4. A method of a global locking manager for processing a locking authority update request and a block allocation request in a Database Management System operated in a shared disk-based multi-system, the method comprising the steps of:
(a) when a current system has obtained a locking by an update authority WX, X (weak exclusive, exclusive) and a current block is updated, writing a log forcedly about the current block based on write ahead logging (WAL) and writing a corresponding block on a disk or allocating the corresponding block through a transfer path;
(b) updating a currently owned buffer locking mode to satisfy a buffer locking mode requested by a remote system using a buffer lock revocation matrix (BLRM), wherein the step (b) further includes:
  (b1) wherein, if the currently owned buffer locking mode is WS (weak shared) and the buffer locking mode requested is WS, S (shared) or WX (weak exclusive), a buffer locking mode to be owned is WS;
  (b2) wherein, if the currently owned buffer locking mode is WS (weak shared) and the buffer locking mode requested is X (exclusive), a buffer locking mode to be owned is NL (no lock);
  (b3) wherein, if the currently owned buffer locking mode is S and the buffer locking mode requested is WS or S, the buffer locking mode to be owned is S;
  (b4) wherein, if the currently owned buffer locking mode is S and the buffer locking mode requested is WX, the buffer locking mode to be owned is WS;
  (b5) wherein, if the currently owned buffer locking mode is S and the buffer locking mode requested is X, the buffer locking mode to be owned is NL;
  (b6) wherein, if the currently owned buffer locking mode is WX or X and the buffer locking mode requested is WS, the buffer locking mode to be owned is WX;
  (b7) wherein, if the currently owned buffer locking mode is WX or X and the buffer locking mode requested is S, the buffer locking mode to be owned is S;
  (b8) wherein, if the currently owned buffer locking mode is WX or X and the buffer locking mode requested is WX, the buffer locking mode to be owned is WS;
  (b9) wherein, if the currently owned buffer locking mode is WX or X and the buffer locking mode requested is X, the buffer locking mode to be owned is NL; and
(c) removing a corresponding block completely when returning a buffer locking as a result of the step (b), and completing to update an ownership otherwise.

* * * * *